(12) United States Patent
Imboden

(10) Patent No.: US 12,507,320 B2
(45) Date of Patent: Dec. 23, 2025

(54) HIGH-TEMPERATURE INFRARED RADIATOR ELEMENT AND METHODS

(71) Applicant: 4K-MEMS SA, St Blaise (CH)

(72) Inventor: Matthias Imboden, St Blaise (CH)

(73) Assignee: 4K-MEMS SA, St Blaise (CH)

( * ) Notice: Subject to any disclaimer, the term of this patent is extended or adjusted under 35 U.S.C. 154(b) by 1382 days.

(21) Appl. No.: 17/260,190

(22) PCT Filed: Jul. 15, 2019

(86) PCT No.: PCT/EP2019/069054
§ 371 (c)(1),
(2) Date: Jan. 13, 2021

(87) PCT Pub. No.: WO2020/012042
PCT Pub. Date: Jan. 16, 2020

(65) Prior Publication Data
US 2021/0176828 A1 Jun. 10, 2021

(30) Foreign Application Priority Data
Jul. 13, 2018 (EP) .................................... 18183541

(51) Int. Cl.
*H05B 3/14* (2006.01)
*G01J 3/28* (2006.01)
*H05B 3/06* (2006.01)

(52) U.S. Cl.
CPC ............... *H05B 3/141* (2013.01); *H05B 3/06* (2013.01); *G01J 3/28* (2013.01); *H05B 2203/017* (2013.01); *H05B 2203/032* (2013.01)

(58) Field of Classification Search
CPC .... H05B 3/141; H05B 3/06; H05B 2203/017; H05B 2203/032

(Continued)

(56) References Cited

U.S. PATENT DOCUMENTS 5,910,659 A 6/1999 Johnson
6,297,511 B1 * 10/2001 Syllaios ............... G01J 5/0896
250/493.1

(Continued)

FOREIGN PATENT DOCUMENTS

DE 102012103662 B3 * 4/2013 ............... H01K 1/08
EP 2848914 A1 3/2015

(Continued)

OTHER PUBLICATIONS

Machine tranlsation of DE 102012103662 performed on Mar. 5, 2025 (published on Apr. 18, 2013).*

(Continued)

*Primary Examiner* — Steven W Crabb
*Assistant Examiner* — Alba T Rosario-Aponte
(74) *Attorney, Agent, or Firm* — Maschoff Brennan

(57) ABSTRACT

An IR radiator element suitable for use as a miniature infrared emitter (micro-hotplate) in a gas sensor, IR-spectrometer or electron microscope. The micro-hotplate comprises a plate supported by multiple support arms. The plate and arms are fabricated as a MEMS device comprising a single contiguous piece of electrically-conducting refractory ceramic such as hafnium carbide (HfC) or tantalum hafnium carbide (TaHfC). Each of the arms, in addition to providing structural cantilever support for the plate (2), acts as a heating element for the plate. The plate is heated by applying a voltage across the arms. The arms may also be shaped to absorb thermomechanical stress which arises during the heating and cooling of the arms and plate. The plate, which may have an area of less than 0.05 mm2 and a thickness of between 1% and 10% of the largest dimension of the plate, for example, can be heated to 4,000 K or more and cooled again with a duty cycle of as little 0.5 ms, thereby permitting pulsed operation at frequencies of up to 2 kHz. Its small size (Continued)

(10-200 μm) and low power consumption (e.g. 10-100 mW) make the micro-hotplate suitable for use in cryogenic applications, in miniaturized devices or in battery-powered devices such as mobile phones.

19 Claims, 13 Drawing Sheets

(58) Field of Classification Search
USPC .......................................................... 219/553
See application file for complete search history.

(56) References Cited

U.S. PATENT DOCUMENTS 8,575,578 B1 * 11/2013 Shie ................... G01N 21/3504
250/496.1

2015/0123016 A1 * 5/2015 Nagatani ................ H05B 3/265
250/493.1
2017/0290097 A1 10/2017 Pindl

FOREIGN PATENT DOCUMENTS

| WO | 20130183203 A1 | 12/2013 |
| WO | 20140168977 A1 | 10/2014 |

OTHER PUBLICATIONS

"A high-temperature MEMS heater using suspended silicon structures" by Kook-Nyung Lee et al in the Journal of Micromechanics and Microengineering, vol. 19 (2009) 115011 (8pp.

"A molybdenum MEMS microhotplate for high-temperature operation" by L. Mele et al in Sensors and Actuators A 188 (2012) pp. 173-180, published by Elsevier, molybdenum.

"Programmable solid state atom sources for nanofabrication" by Han Han et al, published in Nanoscale, 2015, 7, 10735.

* cited by examiner

HIGH-TEMPERATURE INFRARED RADIATOR ELEMENT AND METHODS

FIELD OF THE INVENTION

The invention relates to the field of microelectromechanical systems (MEMS) hotplates such as may be used, for example, as infrared (IR) emitters for gas sensors or in IR spectroscopy. The invention relates particularly, but not exclusively, to radiator elements for IR emitters capable of emitting broadband infrared radiation at temperatures of over 2000 K, or over 3000 K, for example pulsed at frequencies of 1 kHz, or even 2 kHz or more.

BACKGROUND OF THE INVENTION

MEMS micro-hotplates are used as infrared emitters in the near-IR or mid-IR spectral range for such diverse applications as infrared spectroscopy, illumination for gas sensing, as hotplates for a chemical platform, or as hotplate inserts in transmission electron microscopes (TEM) or scanning electron microscopes (SEM). Currently-known devices are able to operate at pulse rates of up to about 100 Hz. There is a need to increase operating frequency and/or reduce power consumption of such devices, but without compromising the IR emission characteristics.

PRIOR ART

Published patent application EP2848914A1 and WO2013183203A1 describe emitter devices in which a resistive layer is formed on an insulator. Heat is generated in the resistive layer, and metal connectors provide electrical, but no significant thermal, energy to the plate. In each case, the fabrication of the device is relatively complex, and the emission characteristics of the emitter are limited by multiple conflicting constraints on the characteristics of the resistive layer, including its sheet resistance, emissivity and melting point.

U.S. Pat. No. 6,297,511 describes a MEMS IR emitter in which the radiator element is a suspended membrane formed as a sandwich of a resistive conducting layer between two insulating layers.

The article "A high-temperature MEMS heater using suspended silicon structures" by Kook-Nyung Lee et al in the Journal of Micromechanics and Microengineering, vol. 19 (2009) 115011 (8pp) describes a MEMS hotplate in which suspended silicon beams are overlaid with platinum tracks which serve as a resistive heater. The device described in this article is capable of operating at temperatures up to 1,300 K with a pulse rate of 100 Hz. U.S. Pat. No. 7,968,848 describes a similar heater with suspended silicon radiator elements.

In the article entitled "A molybdenum MEMS microhotplate for high-temperature operation" by L. Mele et al in Sensors and Actuators A 188 (2012) pp 173-180, published by Elsevier, molybdenum is proposed as a heater filament material, sputtered on to a silicon nitride insulator layer. Although molybdenum has a high melting point (2,966 K), the operating temperature of the device is constrained by the other materials used, such as silicon and silicon nitride, which degrade at temperatures up to 1,600 K and 2,000 K respectively. In theory, available thermal IR emitters could be capable of operating at temperatures above about 1,300 K, but for practical implementation reasons they are rated at lower temperatures than this (up to 1,000 K, for example). This upper operating temperature limit imposes a limit on the intensity and bandwidth of the infrared radiation which can be generated for a given power consumption.

It is also known to provide a source of metal atoms by coating a silicon plate with metal (e.g. silver) and then heating the plate to evaporate the metal by means of heat generated in the plate's resistive supporting springs. Such a technique is described in the article "Programmable solid state atom sources for nanofabrication" by Han Han et al, published in Nanoscale, 2015, 7, 10735. The MEMS evaporator comprises a polysilicon plate supported by two polysilicon springs, which act as resistive heating elements when a current is passed through them. Metal is deposited on to the polysilicon plate, which is protected against eutectic interaction with the metal by a thin $Al_2O_3$ coating. The heated plate provides a source of metal atoms for use in nanolithography, for example. The deposited metal also serves to distribute heat from the two springs across the plate. There is no suggestion in this document to adapt the metal-coated plate for use as a micro-hotplate IR emitter.

Prior art macroscopic halogen sources are available which are capable of generating IR at 3,000 K, but these are large, high-powered, cumbersome devices.

BRIEF DESCRIPTION OF THE INVENTION

The present invention aims to overcome at least some of the disadvantages of the prior art. In particular, there is a need for a radiator device which can be fabricated in a smaller area, for a given radiant power, than prior art radiators, which has a smaller heat capacity and/or which can be operated at higher frequencies. To this end, a radiator device according to the invention is described in the attached claim 1, a method of generating infrared radiation according to the invention is described in claim 14, and a manufacturing method according to the invention is described in claim 16. Further variants of the invention are described in the dependent claims.

By using materials which allow the upper operating temperature limit to be raised significantly, the intensity of the emitted radiation can be greatly increased, as described by the Stefan-Boltzmann law with regards to the total IR power and Planck's Law with regards to the spectral density. For a given radiant power, therefore, the area of the radiator plate can be greatly reduced, the power consumption can be reduced and/or the maximum heating/cooling frequency can be increased. The temperature of the emitter defines the peak spectral wavelength. In this case at 1000 K the peak may be in the IR at around 3 microns, for example. If the plate is heated to 4000 K, the peak is in the visible part of the electromagnetic spectrum. Radiation elements are made possible which exceed the temperature obtained by conventional halogen lamps, but using MEMS formfactors and scalable fabrication methods.

The invention will be described in detail with reference to the attached drawings, in which.

Figure 15:
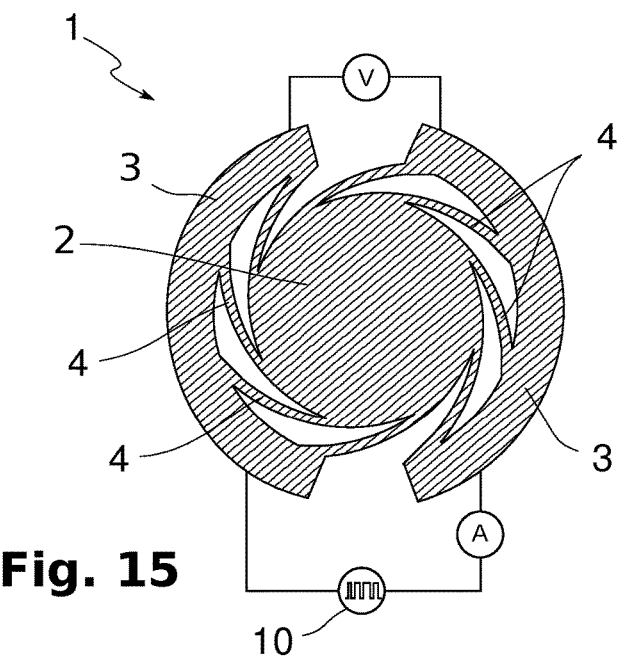
FIG. 15 shows an example of another variant of a radiator according to the invention in which multiple support arms are connect to a common mounting. The figure also shows how the inventive radiator device can be driven by a PWM signal, a voltage source or a current source.
Figure 16:
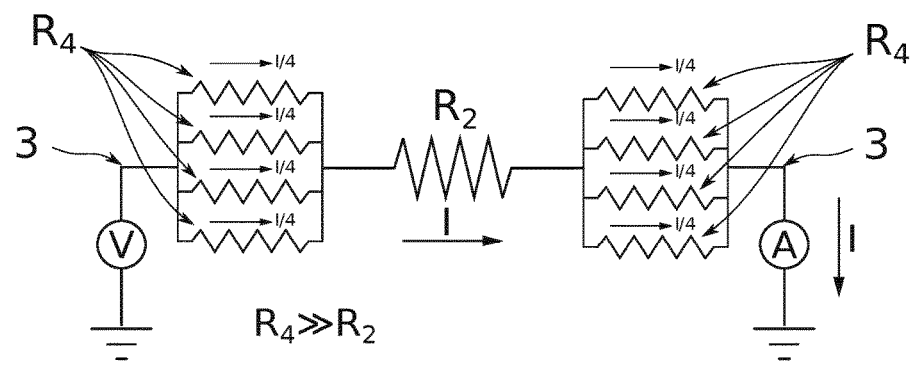

FIG. 16 shows an example of the equivalent resistive circuit for the variant of the radiator shown in FIG. 15. The connectors 3 are, for example, at the set potential or ground potential or close to these potentials. Each of the eight arms 4 are represented by a resistance $R_4$ which is typically much greater, preferably more than 10× greater, even more preferably more than 100× greater, than the resistance of the plate 2 illustrated by $R_2$.

Figure 17:
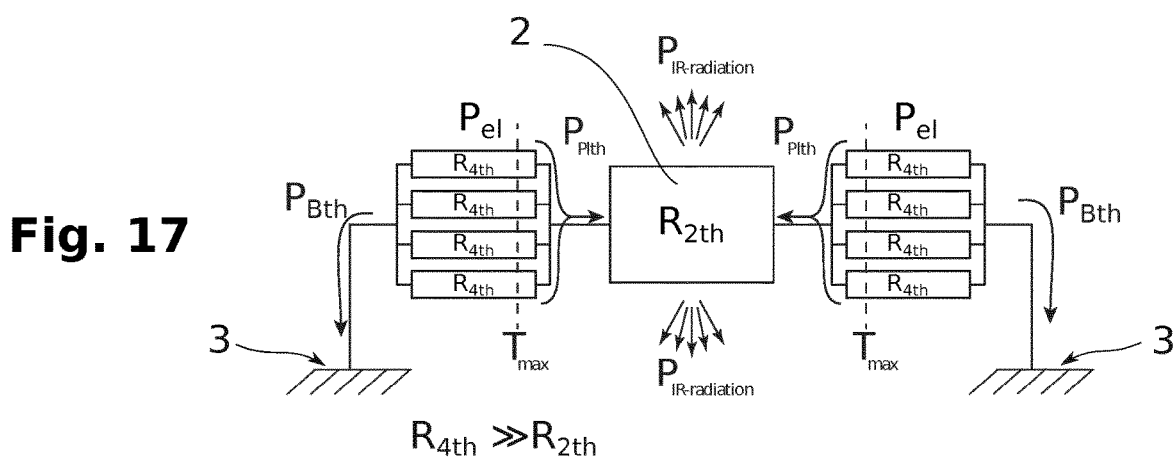

FIG. 17 shows an example of the heat flow illustrated for the example variant shown in FIG. 15. Electrical power is turned to thermal heat in all 8 arms 4, preferably equally. This thermal heat flows onto the plate 2. Some of the thermal heat leaves the plate radiatively as (eg infra-red) radiation. The hottest point of the radiation device on the arms 4, indicated by the dotted line, labelled $T_{max}$.

Figure 18:
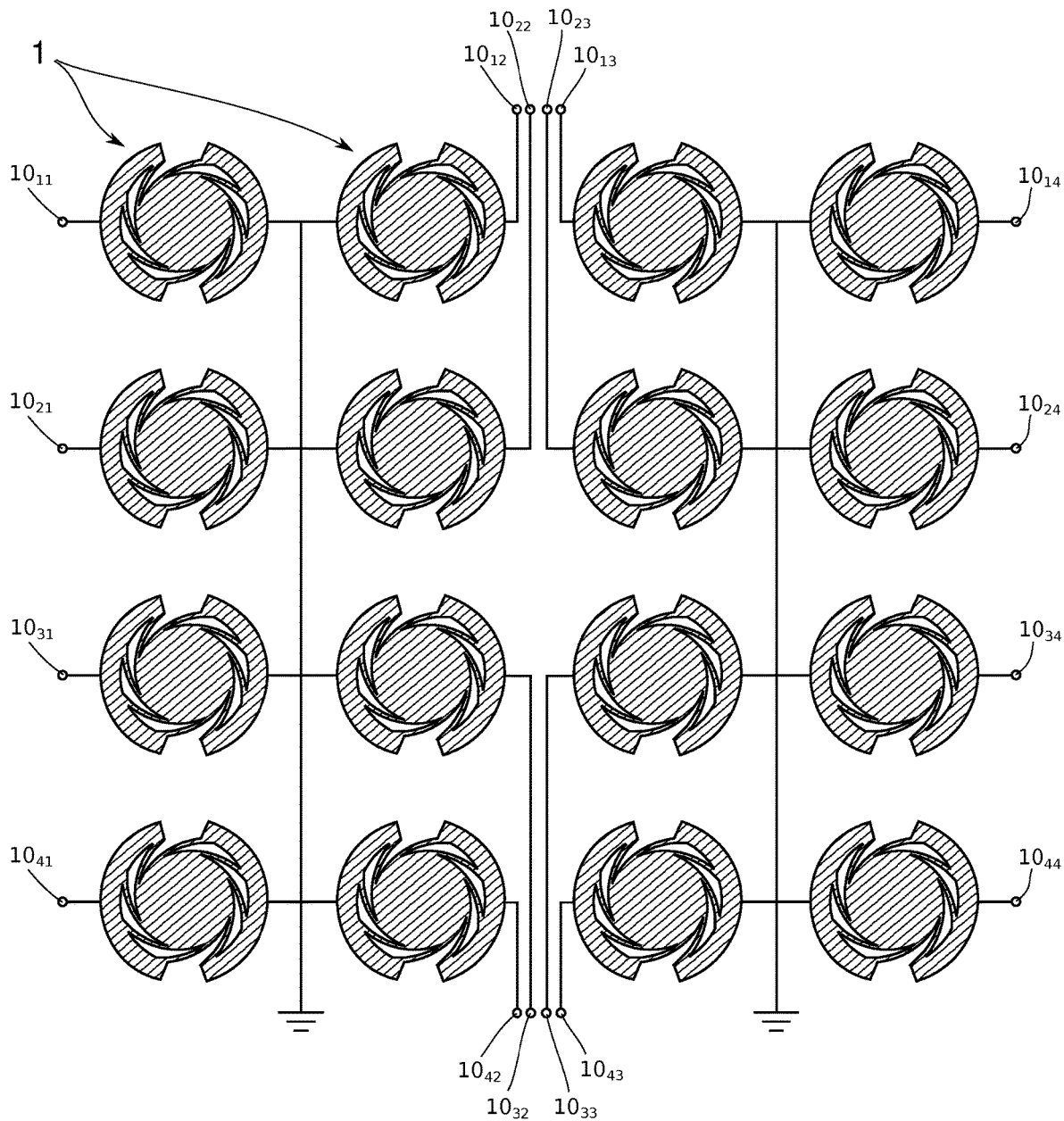

FIG. 18 shows an example of an array configuration of multiple radiator devices according to the invention.

Figure 19A:
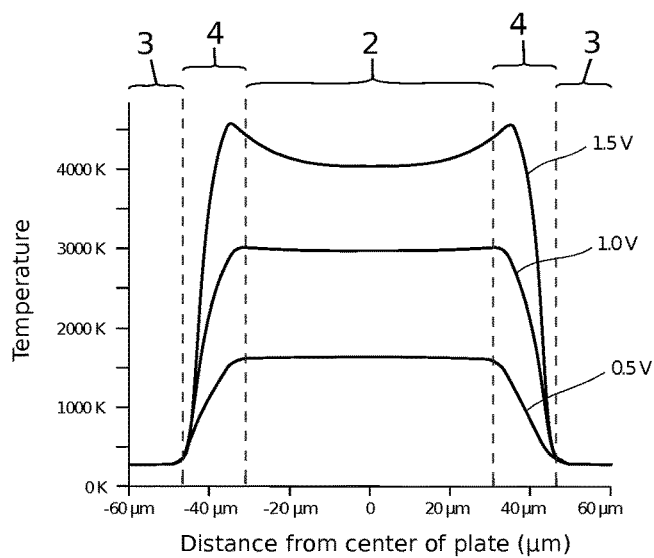

FIG. 19a shows a graph of temperature distribution across a radiator device according to the invention, at different temperatures. The dashed lines indicate the boundaries of elements, including the connection pads 3, arms 4 and plate 2.

Figure 19B:
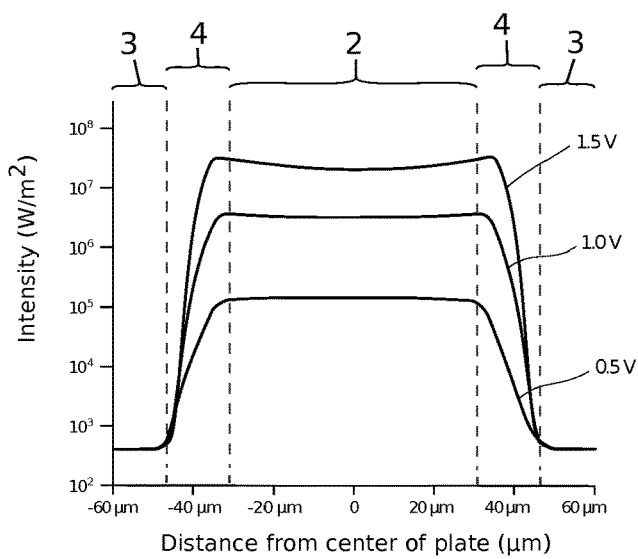

FIG. 19b shows a graph of the distribution of the intensity of the emitted radiation across a radiator device according to the invention, at different temperatures. The dashed lines indicate the boundaries of elements, including the connection pads 3, arms 4 and plate 2.

Figure 19C:
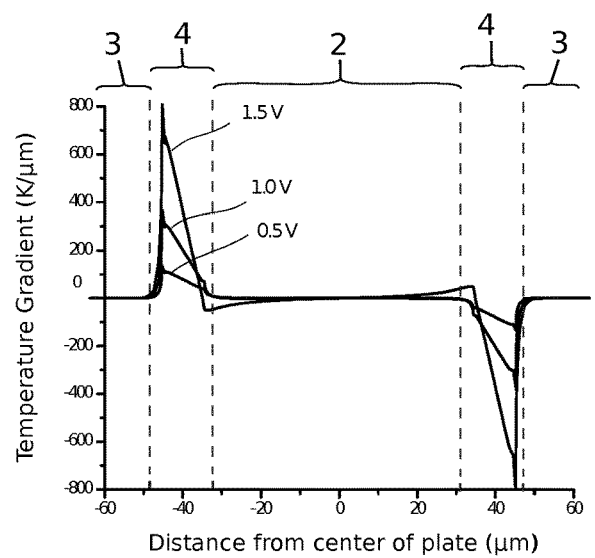

FIG. 19c shows a graph of the temperature gradient between the pads 3, arms 4 and plate 3. The dashed lines indicate the boundaries of elements, including the connection pads 3, arms 4 and plate 2.

Figure 20:
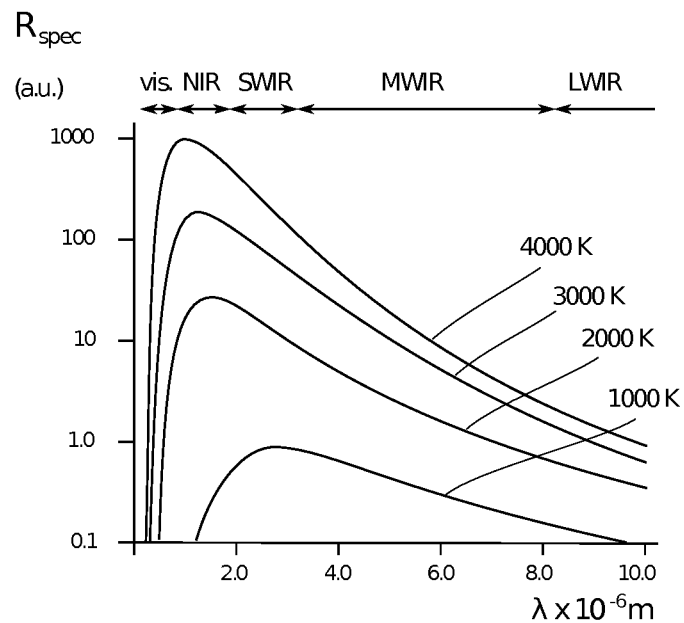

FIG. 20 shows a graph of spectral radiance ($R_{spec.}$) against emission wavelength for different temperatures.

Figure 21:
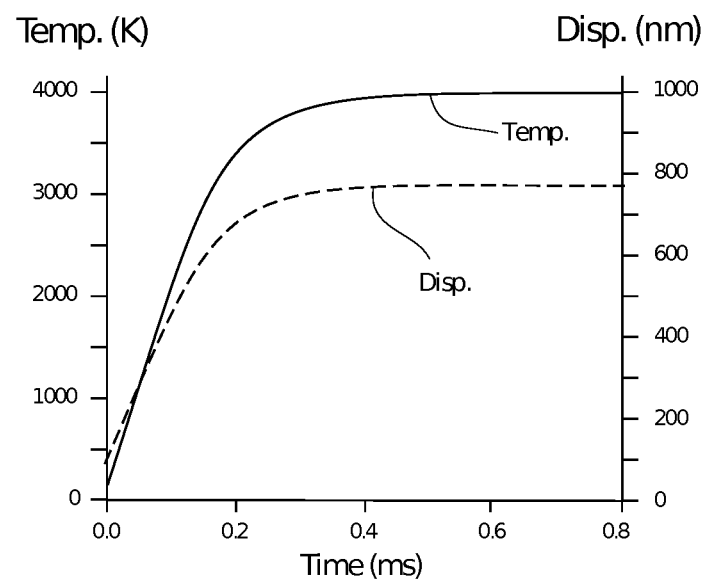

FIG. 21 shows graphs of displacement and temperature against time for an example radiator device according to the invention.

FIGS. 22 to 25 show variants of micro-hotplate IR emitter configurations incorporating a radiator according to the invention.

FIGS. 26a to 26g show an example fabrication process for manufacturing an IR emitter including a radiator according to the invention.

Figure 26A:
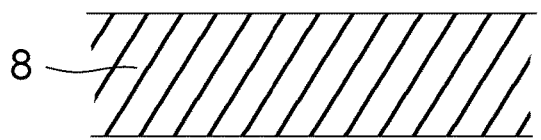
Figure 26B:
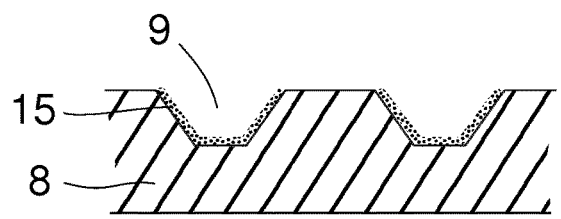
Figure 26C:
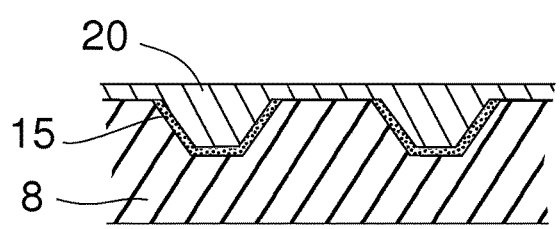
Figure 26D:
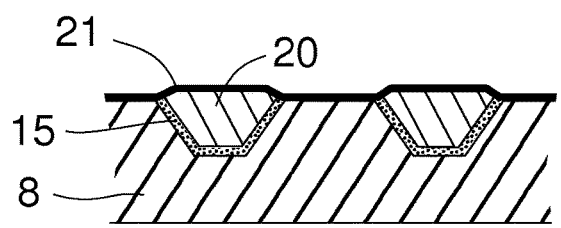
Figure 26E:
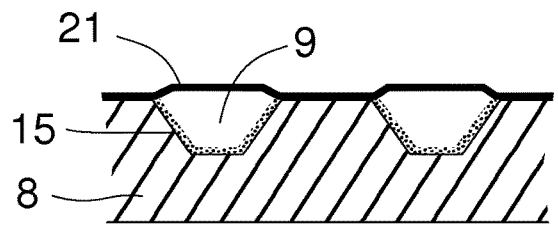
Figure 26F:
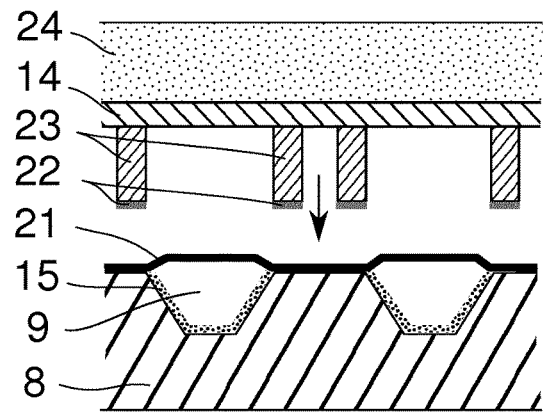
Figure 26G:
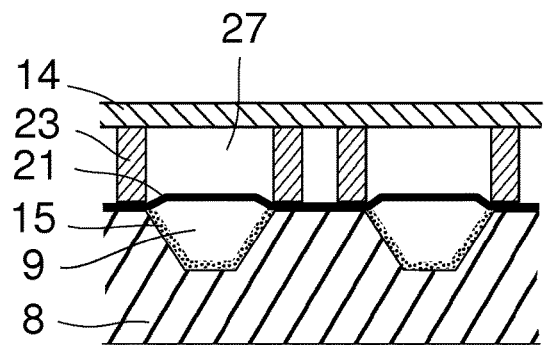
Figure 26H:
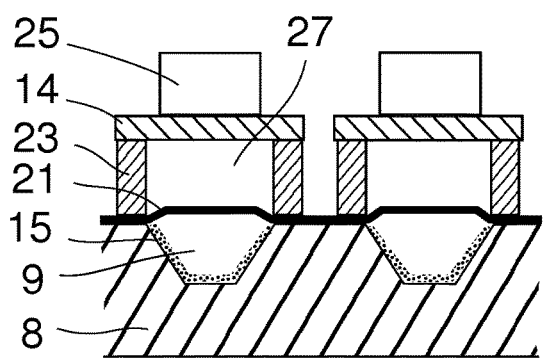

FIG. 26h shows a variant of a fabrication wafer of the invention in which an application device is fabricated on the IR emitter shown in FIG. 26g.

Figure 27:
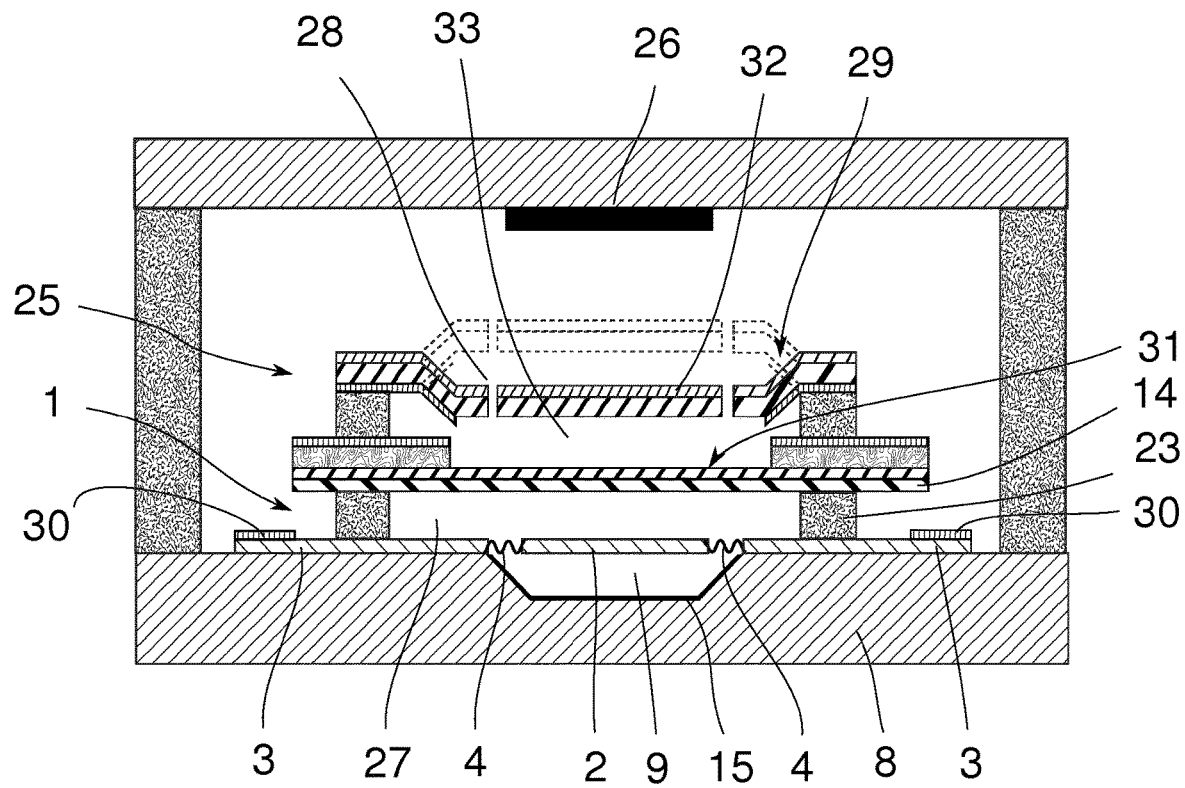

FIG. 27 shows a first example of a Fabry-Perot IR spectrometer application device incorporating a radiator plate according to the invention.

Figure 28:
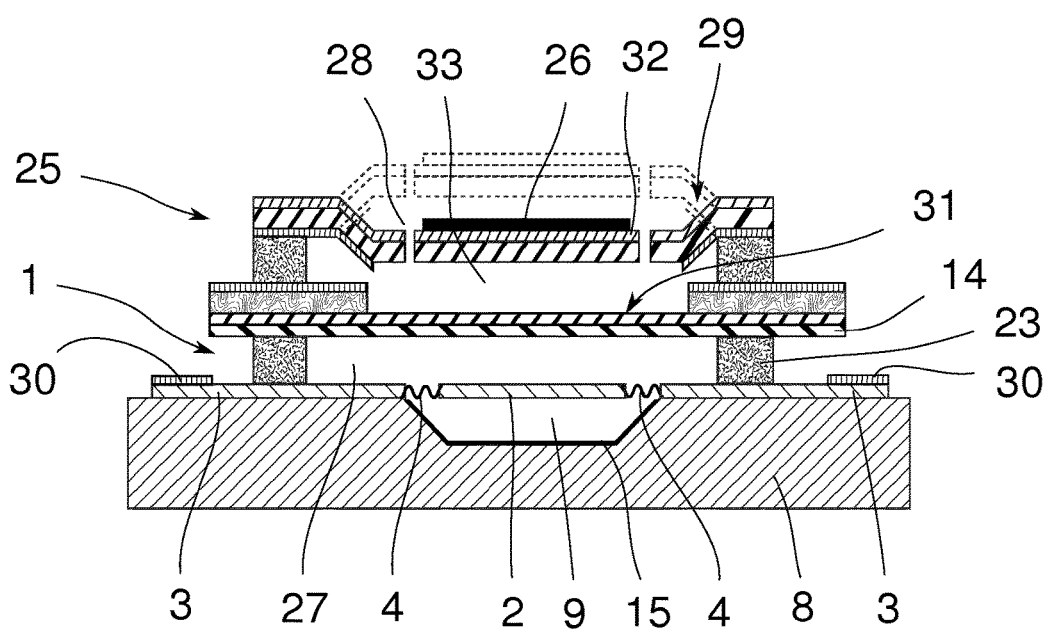

FIG. 28 shows a second example of a Fabry-Perot IR spectrometer application device incorporating a radiator according to the invention.

It should be noted that the figures are provided merely as an aid to understanding the principles underlying the invention, and should not be taken as limiting the scope of protection sought. Where the same reference numbers are used in different figures, these are intended to indicate similar or equivalent features. It should not be assumed, however, that the use of different reference numbers is intended to indicate any particular degree of difference between the features to which they refer.

DETAILED DESCRIPTION OF THE INVENTION

The term "conductive refractory material" is used in this text to refer to an inorganic material which has an electrical resistivity less than 1 Ohm cm, a thermal conductivity in the range 10 W/mK to 2200 W/mK, and which can be heated (at least for short periods of e.g. 10 ms) to very high temperatures (i.e. temperatures in excess of 1,600 K, or preferably in excess of 2,000 K, or more preferably in excess of 2,500 K, or still more preferably in excess of 3,000 K) without degrading or changing to any significant degree. The Young's modulus of the refractory material may lie in the range 100-1000 GPa and the flexural strength may exceed 100 MPa. All material property values are taken at room temperature unless otherwise stated. Suitable materials may include allotropes of carbon such as graphite, diamond (doped), graphene, fullerene, carbon nano-tubes (CNT), and fullerene or CNT deposits (single crystal or fullerene metallic composites), or electrically-conducting refractory ceramics such as hafnium carbide, tantalum carbide, tantalum hafnium carbide, tungsten carbide, titanium carbide, niobium carbide, hafnium boride, hafnium nitride or hafnium tantalum nitride, or any fractional combination of the aforementioned compounds, for example $Hf_{0.98}C$. which may be optionally doped as required to provide the electrical properties for heating as described below.

The term "micro-hotplate" is used in this text to refer to a miniaturized component which provides a very small, very hot surface and/or a very small, very intense source of infrared radiation (IR emitter). The terms "radiator", radiator device" and "radiator element" refer to a very small plate-like or other structure which is incorporated in a micro-hotplate device such as an IR emitter device and heated so as to generate the required intense infrared radiation. The radiator plate may have an area of less than 0.1 mm$^2$, for example, or less than 0.05 mm$^2$.

The invention has been described in relation to its application to generation of broadband infrared radiation. However, the radiator device of the invention may be used to emit light in the visible spectrum—either in addition to, or as an alternative to IR. The application of the principles of the invention to generating visible light may be regarded as a distinct invention.

Figure 1:
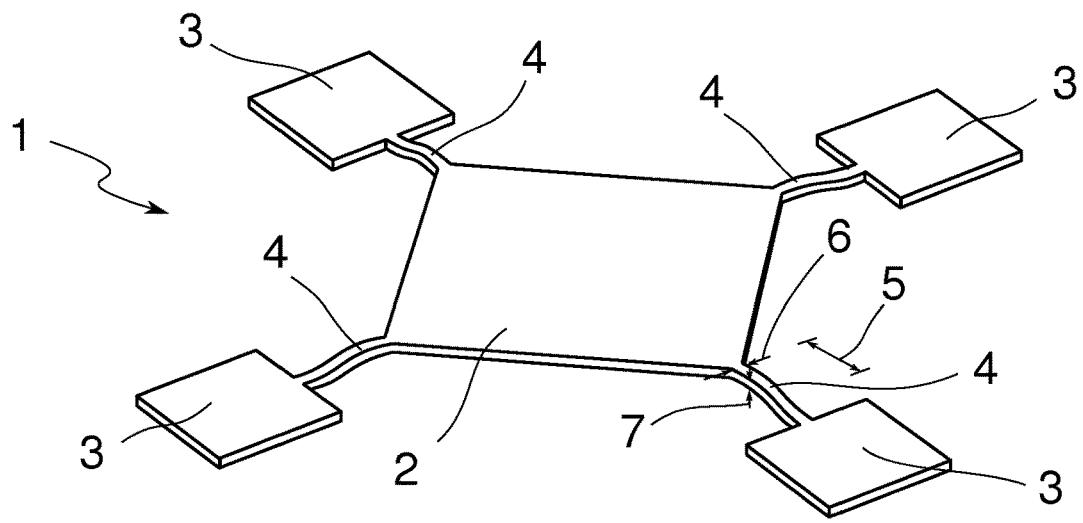
FIGS. 1 and 2 show in isometric projection and plan view respectively a first simplified schematic illustration of a basic radiator plate according to the invention.
Figure 2:
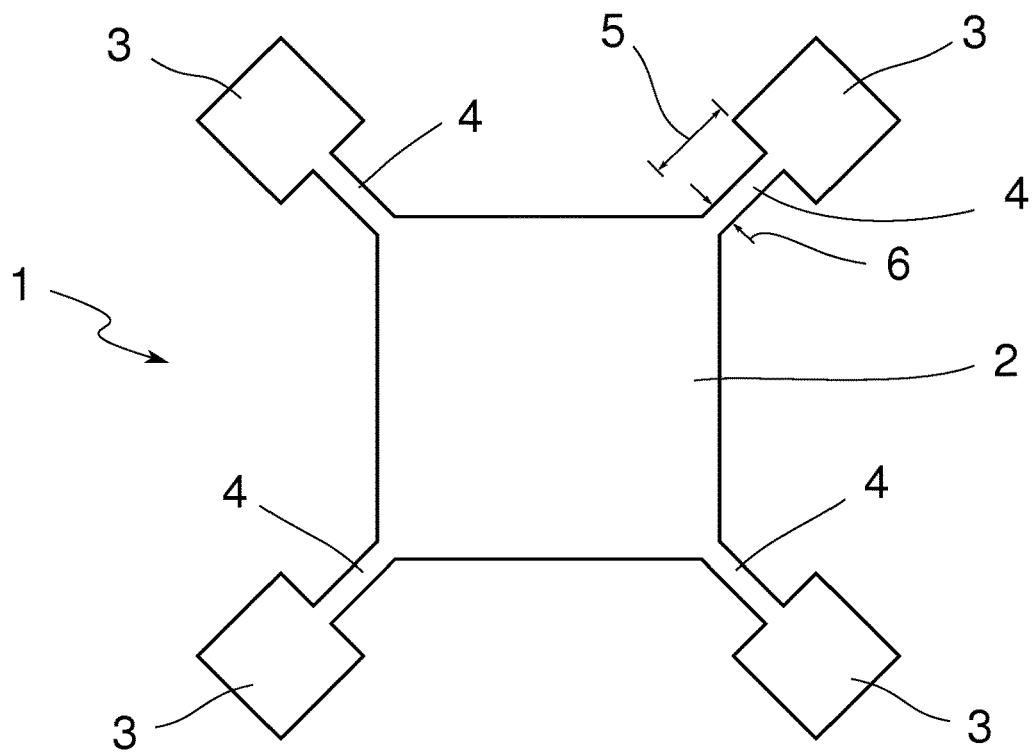

FIGS. 1 and 2 show a first example of a radiator 1 suitable for use as the radiator element of an IR emitter. Unless otherwise specified, the principles and features described in relation to this example also apply to the other examples described below, and to other variants of the invention generally. The radiator 1 comprises a structure 2 (in this example case a square, rectangular or parallelogram plate) made of a conductive refractory material as mentioned above. As will be described, the material of the radiator may be grown or deposited partly (the pads 3) on a substrate and partly (the plate 2 and the arms 4) on a sacrificial material which is subsequently removed, using known semiconductor fabrication techniques, for example. Hafnium carbide has been tested and/or simulated and found to exhibit suitable thermomechanical properties (e.g. sufficient thermal and electrical conductivity, thermal and chemical stability and adequate elasticity) for use in fabricating the radiator element 1.

Figure 3:
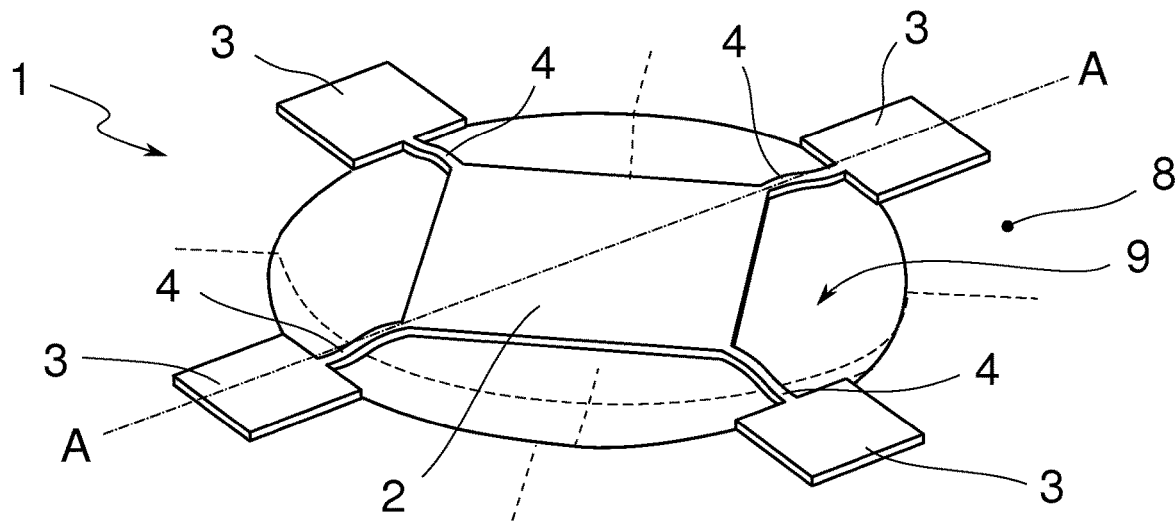
FIG. 3 shows in isometric projection the radiator of FIGS. 1 and 2 formed over a concave recessed region of a substrate in a first example mounting arrangement of a radiator device according to the invention.

In order to operate in the high temperature ranges mentioned above, the radiator 1 may advantageously be housed in a vacuum, or in a rarefied inert gas. The plate 2 may be between 2 and 500 μm in size (length of one side of the square/rectangle/parallelogram in this example), and may have a thickness of between 0.1 and 10% of the side-length of the square (or of the longest dimension of the plate if not square), for example. Although it is illustrated as a continuous planar piece of material of uniform thickness, the structure 2 may alternatively be formed with a non-planar (e.g. concave) shape and/or with a different topology such as a grid or ladder or serpentine configuration or with perforations or surface features or textures. Such surface features or texture may be added to improve the emittance from the surface, for example. A square plate is illustrated in FIGS. 1 to 3, but in practice the plate could be any convenient shape. It can be circular, triangular, square or polygonal, for example. The plate 2 and arms 4 may be co-planar, or they may be non-coplanar, as illustrated. The arms 4 may be formed such that the plate 2 is vertically offset from the plane of the pads 3, so that when the pads are in contact with a substrate 8, the plate is raised above the level of the substrate 8. The arms are depicted as having a small deviation. This may be necessary to absorb thermomechanical displacement during heating and cooling. However, this illustration is only for ease of understanding of the invention. In practice, as will be discussed below, other shapes and arrangements of the arms 4 may be required in order to provide adequate movement absorption.

The plate 2 is supported by multiple arms 4 (e.g. four as in the illustrated example), also referred to as support elements or springs or heaters or heater springs, which extend between the plate 2 and the connection pads 3. As will be described in relation to FIG. 3, the connection pads 3 are designed to provide mechanical connection to a substrate such that the plate is only supported relative to the substrate by the arms 4 and pads 3. The connection pads 3 provide electrical connection to the arms 4, and thereby to the plate 2. The plate 2, pads 3 and arms 4 are preferably made of a single contiguous piece of material. The material may have a uniform bulk resistivity, or it may have a bulk resistivity which is different in different parts of the radiator 1. For example, the material of the arms 4 may be doped or otherwise treated to give the arms a lower bulk resistivity than the material of the plate 2. The bulk resistivity of the material of the arms may preferably be in the range $10^{-5}$ to 0.1 Ohm cm, for example. Each of the arms 4 in the illustrated example of FIG. 1 has a length 5, a width 6 and a thickness 7, and a cross-sectional area which is much smaller than that of the plate 2. The width 6 and thickness 7 may advantageously present an aspect ratio (thickness:width) of between 1:10 and 1:1 for improved stability. By way of example, the arm length may be between 5 and 200 μm, for example, or preferably between 10 and 150 μm, or more preferably between 15 and 80 μm. The thickness may be between 0.1 and 5 μm, for example, or more preferably between 1 and 3 μm. The width of the narrowest part of the arms may be as little as 0.1 μm or as much as 20 μm or more, for example. In the case of a monolayer material such as graphene, the plate 2 and arms 4 may only be as thick as the monolayer (or stack of monolayers if multiple layers are stacked).

Applying a voltage between two outer ends of the arms 4 (e.g. by making electrical connection to the connected pads 3) causes heat to be generated by Ohm heating in the arms 4. The arms 4 are thermally connected to the radiator plate 2. The radiator plate 2, which may be suspended in a vacuum, acts as a sink for the heat generated in the arms 4. At higher temperatures (e.g. 3000 K to 4000 K) the proportion of heat generated in the arms 4 which is radiated from the plate 2 as IR increases.

Figure 4:
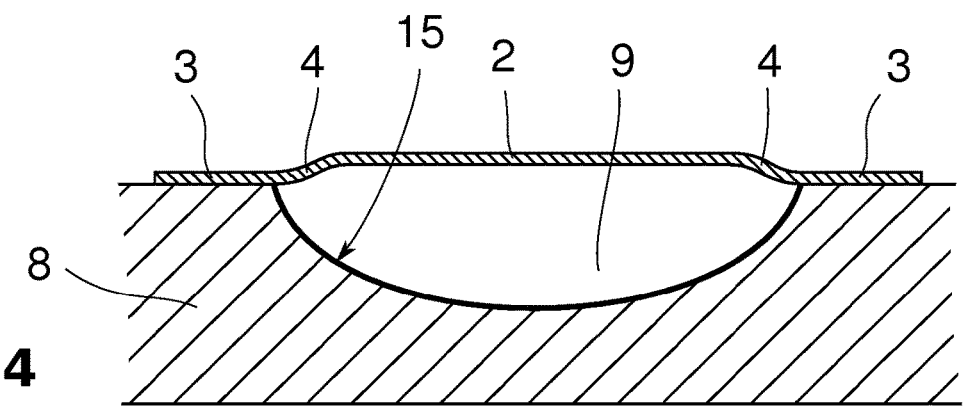
FIGS. 4 and 5 show schematic cross-sectional views along the axis A-A of FIG. 3 of first and second variants of the recessed substrate.
Figure 5:
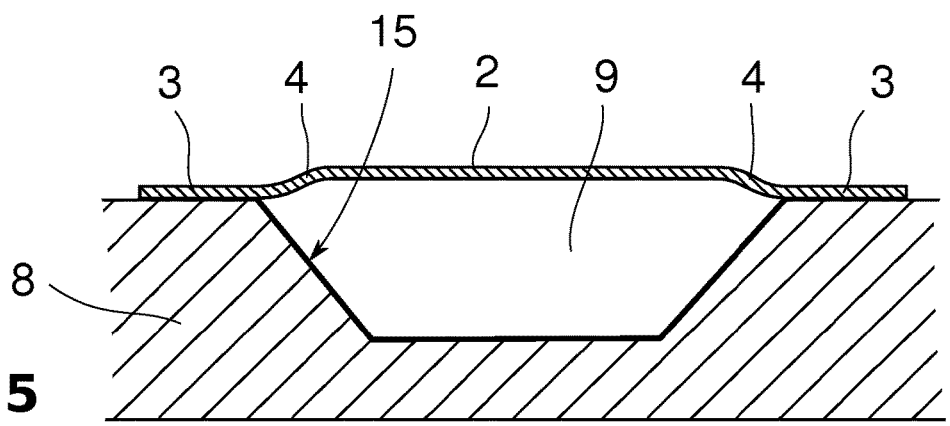

FIG. 3 shows how the radiator 1 of FIGS. 1 and 2 can be mounted or fabricated on a substrate 8 such that there is a concave recess 9 beneath it. Such a structure may be formed using known semiconductor fab techniques, for example. As will be discussed below, the concave recess 9 may be formed with a smooth curved (e.g. parabolic) surface, as shown in FIG. 4, or with a different shape such as the angled walls shown in FIG. 5. The concave recess may serve to direct IR radiation from the plate 2 outwards (away from the substrate 8) and thereby enhance the net radiant power of the microhotplate assembly. This can be achieved by means of a reflective surface or coating 15.

The examples shown in FIGS. 1 to 5 have four heater arms/springs. However, the number of springs (arms 4) can range from 2 to 16 or more. The number may preferably be even, since this makes it easier to balance input and output current and therefore to achieve a more even heat distribution. The heat generated in the arms is conducted to the plate 2, as mentioned. Experimentation and simulation show that the plate in this example can reach a thermal steady state within 0.2 to 0.5 ms, which means that the temperature can be modulated at 2 kHz to 5 kHz. If the plate 2 is made smaller still, operating frequencies of 50 kHz or even 100 kHz are possible.

Total power consumption for the plate may be as little as 10 mW per plate or as great as 1 W, for example, depending on the radiator configuration and plate size.

Mechanical resonance is of the order of 1 MHz, which means that the device is insensitive to all typical external vibrations and shocks. This value can be lower or higher depending on the geometry of the device and the chosen material it is made of. The mechanical modes may be above 1 kHz, or preferably greater than 10 kHz or more preferably greater than 100 kHz, such that the structure is capable of withstanding shock resulting from impact, were the device to be dropped, for example.

Figure 6:
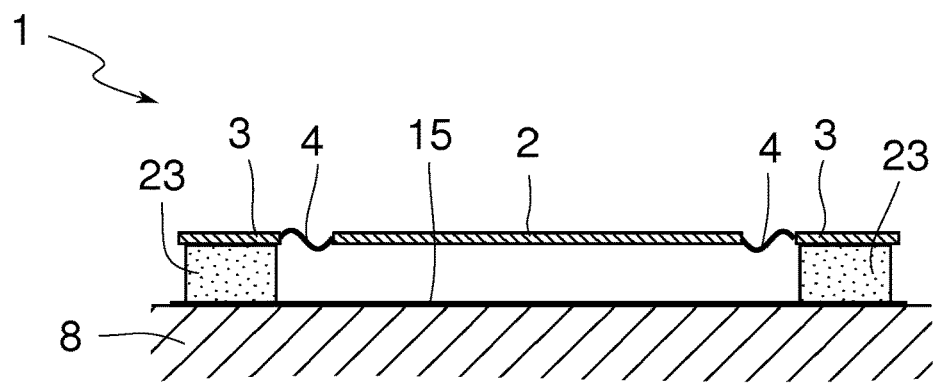
FIG. 6 shows in schematic plan view a second example mounting arrangement of the radiator plate of FIGS. 1 and 2.

FIG. 6 shows an alternative arrangement for mounting the radiator 1 to a substrate 8. In this case, the substrate 8 may be coated or polished with a reflective surface or layer 15, and the pads 3 are formed or mounted on spacers 23, which serve to hold the plate 2 away from the substrate 8. Arms 4 are represented symbolically by wavy lines, but these symbols are intended to correspond generally to any variant of the heater/spring arms which may be used. The spacers 23 can be made from the same material as the sacrificial layer used to separate the device material from the substrate 8, or alternatively they can be made from a separate insulating or conducting material, preferably with a high thermal conductivity.

Figure 7:
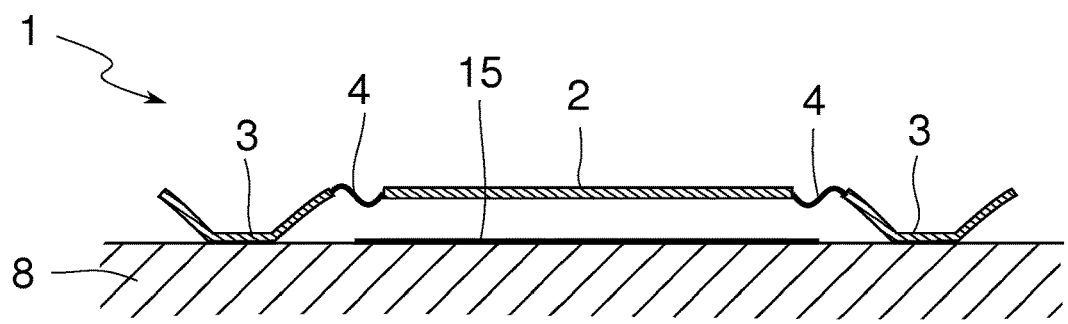
FIG. 7 shows in schematic plan view a third example mounting arrangement of a radiator plate according to the invention.

FIG. 7 shows another variant in which, instead of the spacers 23 of FIG. 6, the pads 3 are shaped to provide the desired vertical offset from the substrate 8 and the reflective surface/layer 15.

Figure 8:
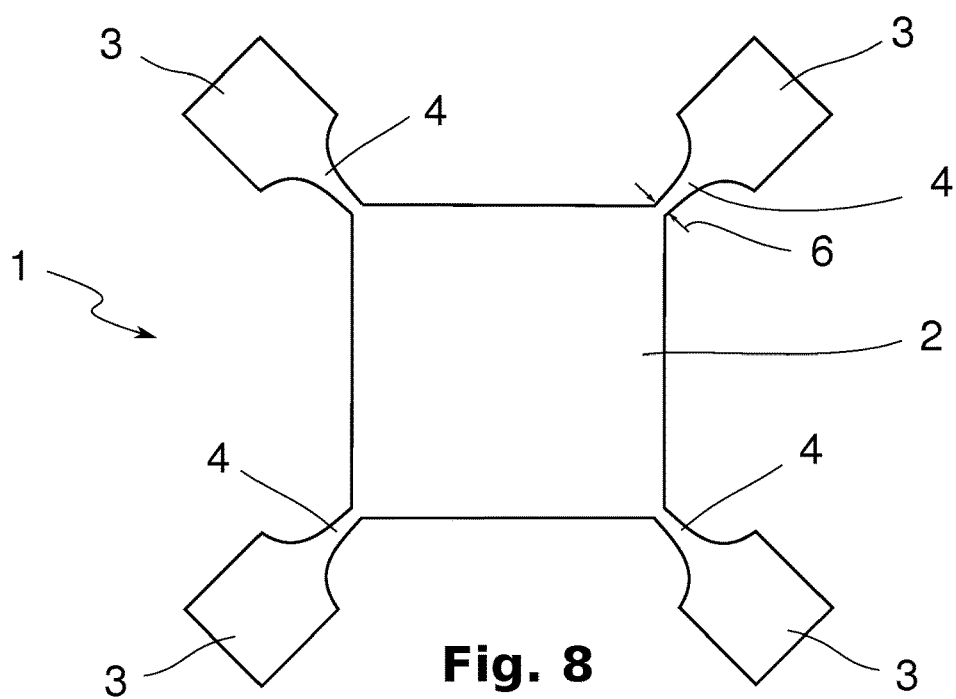
FIG. 8 shows in schematic plan view an example of a variant of a radiator according to the invention in which the heater/support arms are tapered.

FIG. 8 shows a variant of a radiator 1 in which the resistance of the arms 4 increases nearer to the plate 2. This may be achieved by tapering the cross-sectional area of the arm 4 (e.g. by tapering the width 6 as illustrated), and/or by variable doping of the material of the arm 4 so as to increase the bulk resistivity of the material of the arm 4 towards where it meets the plate 2. The local increase in resistance means a local increase in Ohmic heating near the plate, so that a greater proportion of the generated heat flows into the plate. Such a tapering of the resistance can be used in any variant of the radiator of the invention.

Figure 9:
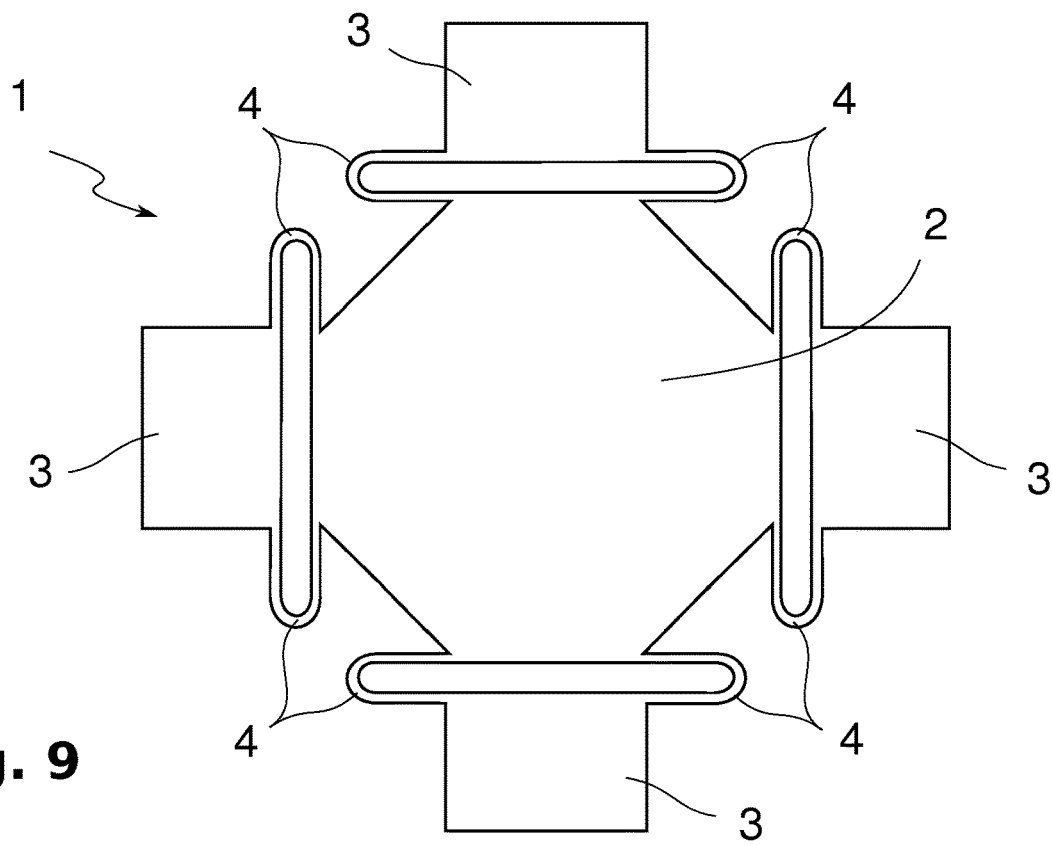
FIG. 9 shows in schematic plan view an example of another variant of a radiator device according to the invention in which the heater/support arms are formed as elastic elements having a first example configuration for absorbing thermomechanical expansion, contraction or other movement of the radiator plate or arms.
Figure 10:
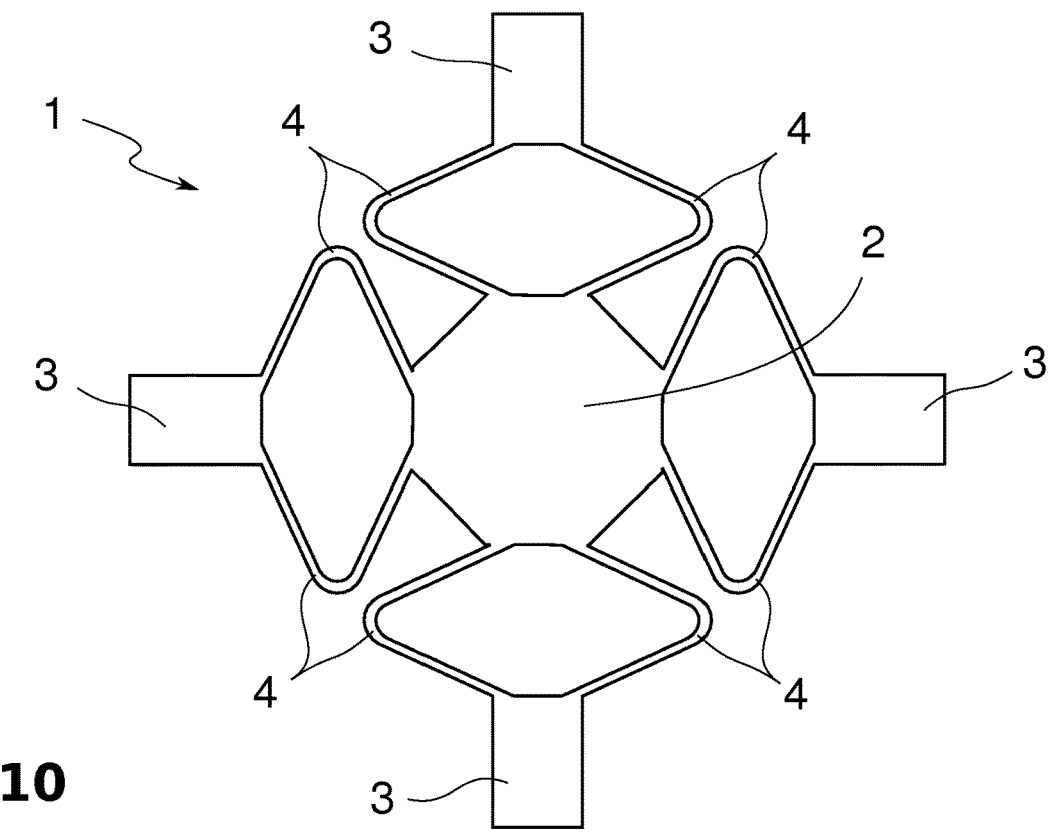
FIG. 10 shows in schematic plan view an example of another variant of a radiator device according to the invention in which the heater/support arms are formed as elastic elements having a second example configuration for absorbing thermomechanical expansion, contraction or other movement of the radiator plate.
Figure 11:
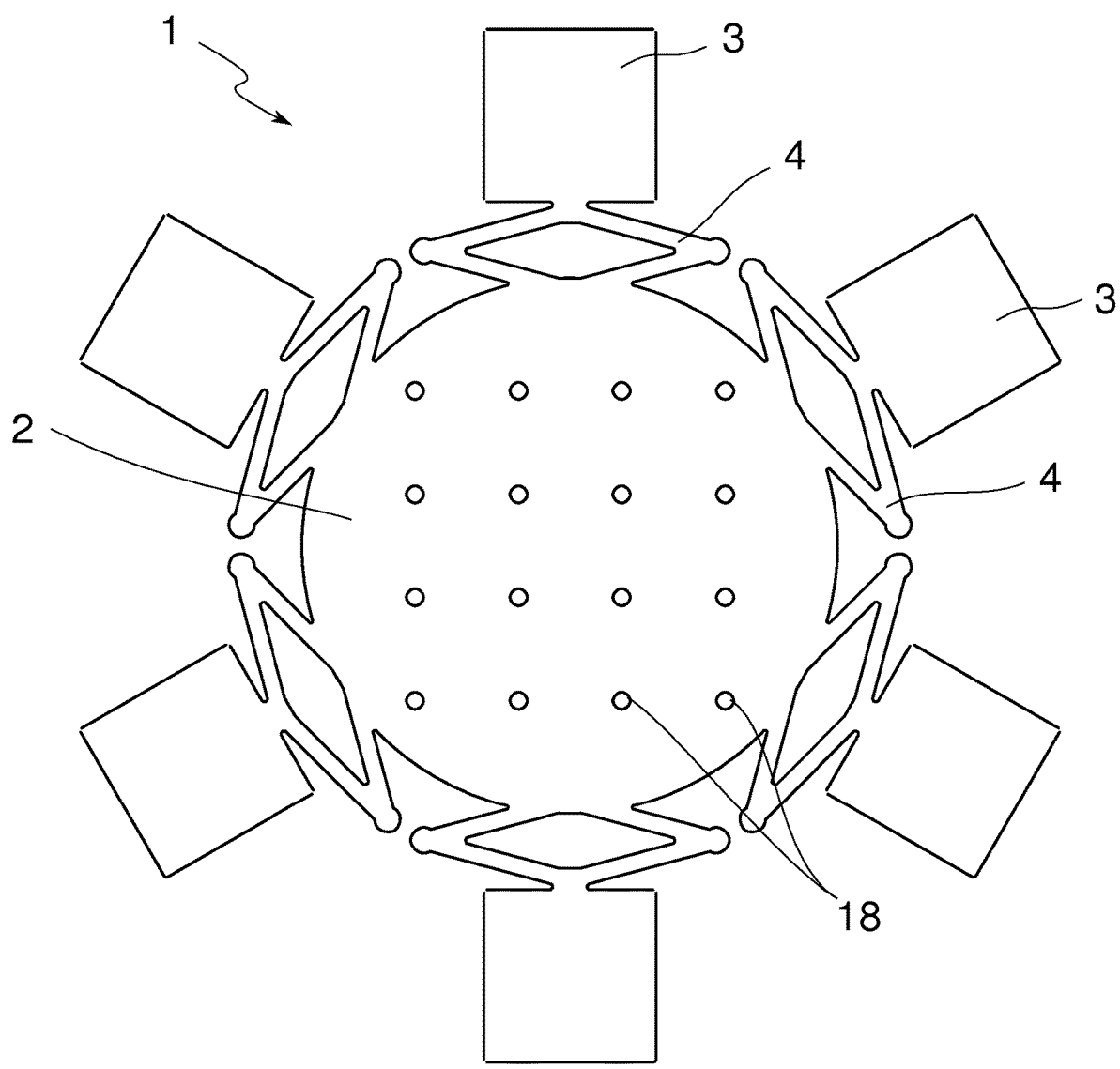
FIG. 11 shows in schematic plan view an example of another variant of a radiator device according to the invention in which the heater/support arms are formed as elastic elements having a third example configuration for absorbing thermomechanical expansion, contraction or other movement of the radiator plate.

FIGS. 9 to 11 show different variants of radiator elements 1 in which the arms 4 are configured to absorb mechanical deformation of the plate 2 and/or of the arms 4 as they heat and cool. The thermal expansion coefficient of refractory ceramics such as HfC may be in the range of $1$-$10 \times 10^{-6}$/K, and allowance should preferably be made for such thermomechanical movement by shaping the heater/support springs 4 in such a way as to provide an elastic buffer against the expansion and contraction movement. Over a temperature change of 3,500 K, the plate 2 may expand or contract by approximately 1-3% (across the whole plate). FIG. 9 shows a variant with a larger (e.g. 100 µm across) octagonal plate 2, while FIG. 10 shows a variant with a smaller octagonal plate 2 (e.g. 10 to 30 µm across). In both octagonal plate examples, each connection pad 3 is connected to the plate 2 via two arms 4. In the small-plate example (FIG. 10), there is minimal thermomechanical deformation of the plate 2, and a substantially uniform temperature across the plate.

FIG. 11 shows another variant in which each pad 3 is connected by two arms 4 to the plate 2. Six pads 3 and six double arms 4 are provided, and the plate 2 has a substantially circular shape. Small holes, in this case circular, but other shapes such as square or rectangle may be used for example, are cut into the plate 2. Depending on the fabrication process used, such holes can aid in the release step, when the material below the plate is removed to create the free-standing structure. Such holes may be advantageous in any of the examples provided and are not limited to the implementation depicted in FIG. 11.

Figure 12:
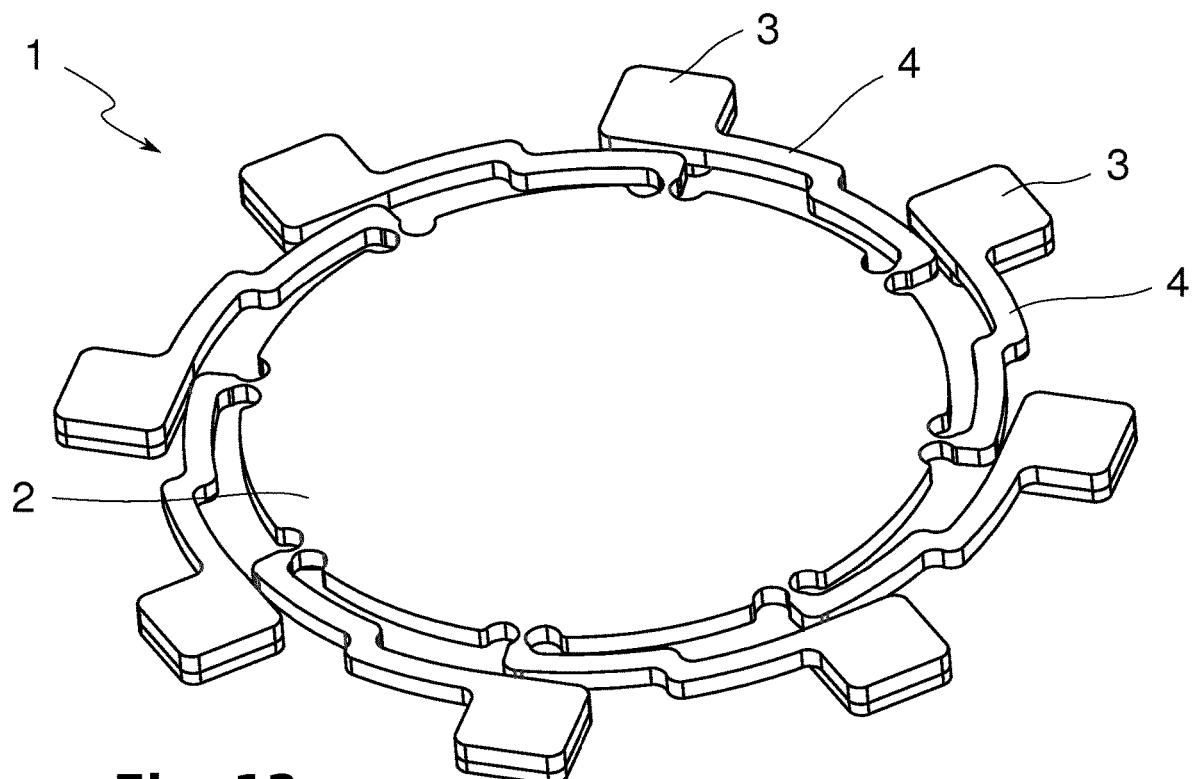
FIGS. 12 and 13 show, in isometric projection and plan view respectively, another variant of a radiator device according to the invention.
Figure 13:
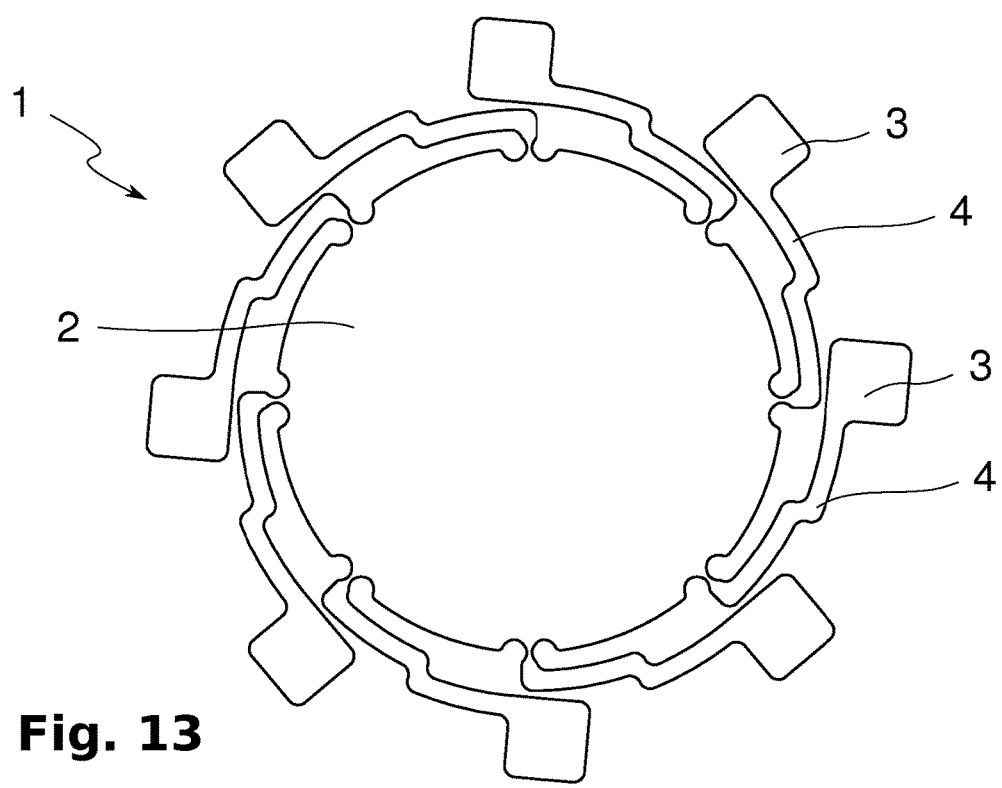

In the examples of FIGS. 9, 10 and 11, each connection pad 3 is connected to multiple arms 4. FIGS. 12 and 13, by contrast, show a variant in which each arm 4 is connected to one connecting pad 3. The plate 2 in this example may be between 10 µm and 200 µm in diameter, for example. In this case, the arms 4 and plate 2 are arranged such that thermo-mechanical displacement results in a rotational motion of the plate 2. In order to achieve this with a minimum of stress in the arms 4, the arms are shaped and oriented along a peripheral path parallel to the rotation of the periphery of the plate 2. The arms 4 may optionally include a stepped or offset section, as illustrated, in order to permit the arms to overlap and thereby to allow longer arms to be fitted in a small peripheral region around the plate 2. The arms 4 of this example variant are connected to the plate by a narrowed radial portion which may be formed, for example, by forming notches in the periphery of the plate 2 on either side of the radial portion. When a voltage is applied across the pads 3, the narrowed radial portions serve as the principal heating source for the plate 2.

Figure 14:
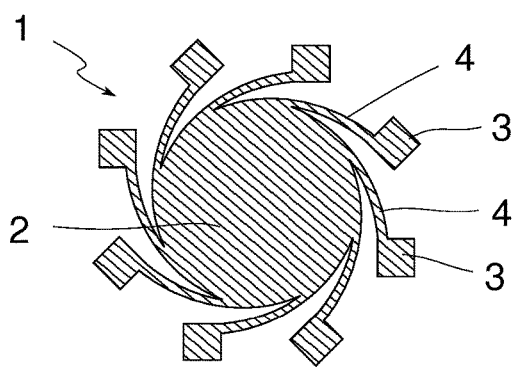
FIG. 14 shows in schematic plan view an example of another variant of a radiator according to the invention in which the heater/support arms are formed as elastic elements having another example configuration for absorbing thermomechanical expansion, contraction or other movement of the radiator plate.

FIGS. 14 and 15 show simplified schematic examples of radiator elements which are similar in principle to the variant of FIGS. 12 and 13, in which the plate 2 is substantially circular, with tangential springs/arms extending between the plate 2 and the mounting pads 3. In the example of FIG. 14, each connection pad 3 is connected to the plate 2 by four springs 4. In general, it is advantageous to provide an even number of arms/springs, as this makes it easier to fabricate the radiator with balanced electrical input and output connections. Using a larger number of shorter arms results in a more uniform heat distribution in the plate, and a faster response time, but also in a greater power consumption. A larger plate generally requires more springs to heat it effectively. Longer springs offer better mechanical strain relief, but slower response times. Longer, thinner springs are also more susceptible to break if the device is subjected to shock. The circular plate and tangential springs of FIGS. 14 and 15 result in a very small rotational movement of the plate 2 as it heats and cools. This rotation of the device examples presented in FIGS. 12, 13, 14 and 15 is in contrast to the previous device examples where the plate undergoes only radial expansion and practically no rotation is observed.

The mechanical stresses generated by the thermal expansion are mitigated by arms 4. The thermal expansion of the plate 2 and the arms 4 should preferably be compensated to ensure mechanical integrity and to maintain mechanical, electrical and thermal continuity. In the examples of FIGS. 9, 10 and 11 the thermal expansion results in the arms 4 flexing as they elongate and the plate 2 expands radially. In the examples given in FIGS. 12, 13, 14 and 15 the plate 2 rotates due to the radial expansion of the plate 2 and the linear expansion of the arms 4. The arms 4 will also flex. In the example of FIG. 1 the thermal stresses will cause buckling above a given temperature. The arms 4 can have additional structure, such as, but not limited to notches, tapering, and serpentine structure, to tune and control the mechanical deformation, along with the electrical and thermal conductivity.

FIG. 15 also shows the radiator 1 connected to a pulse width modulation signal 10, and a current source or a biasing voltage source. When driven in PWM mode, the PWM duty cycle can be varied to vary the temperature and spectral characteristics of the IR emitted from the radiator. In this example the drive signal is defined through a PWM signal. The PWM frequency should preferably be higher than the thermal response time of the device described above, preferably by a factor 10 or more. In addition, or alternatively to the PWM control, the device can be driven with a dc or ac voltage bias, typically of order 1 V but can be as low as 1 mV or as high as 100 V, depending on the radiator 1 geometry and material. Voltage biasing will result in stable operation for materials with an increasing resistivity with respect to temperature. Alternatively, the radiator can be driven by a current bias, also in dc or ac mode. This current bias will typically range up to 10 mA but may be higher or lower depending on the radiator 1 geometry or the material used. A current biased radiator 1 would be the stable option for a device where the arm 4 resistance decreases with increasing temperature.

Additional electrodes can be added, for example to the radiator shown in FIG. 15, that allow for the voltage to be measured between the two pads 3. This enables real-time monitoring of the resistance of the device. In the arms 4, but also the plate 2, the resistance varies with temperature. Adding additional electrodes such as illustrated in FIG. 15, allows for the voltage and current to be recorded. From this the resistance can be determined and, with appropriate calibration, the resistance will translate into an IR spectrum and intensity. Such feedback can be used to improve the stability of the IR radiation emitted.

FIG. 16 shows an example of the equivalent circuit diagram for the variant depicted in FIG. 15. In this variant there is a plurality of arms 4 (eight are illustrated) connected to the plate 2. A first subset of one or more of the arms 4 (four arms in the first subset in this example) are connected electrically (in parallel in this example) to a first connection pad 3 on the left and a second subset of the arms (four arms in the second subset in this example) are similarly parallel-connected to a second connection pad 3 on the right. When the first pad 3 is set to the potential V, or close to the potential V, and the second pad 3 is set to a different potential, for example the ground potential or close to ground, this causes a current, I, to flow from the first pad 3, through the first subset of parallel-connected arms 4, through the plate 2, and through the second subset of parallel-connected arms 4 to the second pad 3 which has the lower potential. If all the arms 4 are electrically identical then, as described by Kirchhoff's laws, the current in each arm 4 is I/4. Consequently, the electrical power dissipated in each arm 4 is also equal and has a value of $R_4 I^2/16$, were $R_4$ is the electrical resistance of each arm 4. Preferably the resistance of the plate 2, $R_2$, is significantly lower than the resistance of each parallel-connected subset, and much lower than the resistance $R_4$ of each individual arm 4. This ensures that most electrical power is dissipated in the arms 4, such that most of the heat generated by the electrical current flowing through the series-connected arrangement of pad-arms-plate-arms-pad is generated in the arms, and less is generated in the plate. When seen as a series connected circuit of pad-arm(s)-plate-arm(s)-pad, the resistance of each arm subset is preferably at least 10 times, or more preferably at least 50 times or even at least 100 times greater or more than the resistance of the plate. To minimize the electrostatic interaction between the plate 2 and the substrate 8 or reflective surface 15 the applied potential on either pad can be set so that the plate potential 2 is at the same potential as the substrate 8 or the reflective surface 15. For examples if one pad is at the potential V/2 and the opposite pad is at −V/2 then the plate 2 potential is at 0 which is preferably also the potential of the substrate 8 and the reflective surface 15.

In FIG. 17 the generated power and heat flow is illustrated schematically for the example variant shown in FIG. 15. Electrical power $P_{el}$ is converted to thermal power in the arms 4, making the arms 4 the hottest points of the radiative emitter. Preferably the hottest point on each of the arms 4 is close to the plate 2, as indicated by $T_{max}$ in FIG. 17. This means that the thermal resistance in the thermal path to the pads 3 is high compared to the thermal resistance to the plate 2. Of the heat generated in the arms 4, a small amount of it flows as thermal power $P_{Bth}$ into the pads 3, which are preferably at a temperature close to the temperature of the substrate, which is may be close to the ambient temperature, for example. The ambient temperature may be room temperature, typically 300 K, but can also be much lower or much higher if the emitter is operated in a cryostat or a heated environment. Some, preferably most, more preferably substantially all, of the thermal power generated in the arms flows as $P_{Plth}$ on to the plate 2, where it heats the plate 2 to the desired temperature. The thermal energy on the plate 2 is emitted radiatively as electromagnetic radiation $P_{IR-radiation}$, for example as infrared radiation with some visible light radiation.

As the thermal power emitted radiatively scales as $\sim T^4$ but the thermal conductance from the plate 2 and arms 4 to the pads 3 scales as $\sim ST$, the emitter becomes more efficient at higher temperatures.

FIG. 18 shows an IR emitter comprising an array of multiple (16 in this example) radiator elements 1, connected so that each can be driven by a separate PWM signal. Such an array may be used, for example, for generating infrared radiation with a particular spectral profile. The effectively larger surface area increases the IR radiation generated. By selecting the number of radiators 1 which are turned on, the intensity can be tuned without shifting the spectrum. A single power supply can drive all radiators in the array with transistors setting the PWM or voltage or current signal on each element (radiator 1) of the array.

FIG. 19a shows an example of how the temperature of the plate may vary across the radiator plate for different applied voltages (for example along the axis A-A in FIG. 3). The x-axis shows the distance measured from a central point on the axis. The y-axis shows the temperature of the plate 2 and arms 4 measured at the corresponding location along the axis. Portions of the curve are labeled to indicate which part (pad 3, arm 4 or plate 2) the correspond to. In this example, the plate has a diameter or transverse dimension of approximately 70 μm and an arm length of approximately 15 μm. In each of the three temperature curves shown, the temperature of the connection pads 3 is substantially constant at ambient temperature (e.g. 290-300 K), while there is a steep temperature gradient in the arms 4 and a more or less flat temperature profile across the plate 2. In the case of a 1.5 V applied voltage (in this example), the central region of the plate 2 is cooler than the peripheral region near the inner ends of the heating/support arms, where heat transfer from the arm to the plate takes place. This is a consequence of the significantly greater radiation (and consequently greater optical power and consequently greater cooling of the plate 2) emitted at higher temperatures (e.g. around 4,000 K) than at lower temperatures. For example, the optical power density at 4000 K may correspond to approximately 12 MWm$^{-2}$ at 0.85 emissivity. At 4000 K, the spectral radiance at a wavelength of 3 microns is approximately two orders of magnitude greater than at 1000 K, and the peak spectral radiance is approximately three orders of magnitude greater.

The curves shown in FIG. 19a correspond to those predicted by Planck's law. FIG. 19b, on the other hand, shows how the distribution of radiant intensity may actually vary with temperature across the same radiator device. Raising the applied voltage from 0.5 V to 1.5 V (and thereby the temperature from approximately 1600 K to over 4,000 K, produces more than two orders of magnitude increase in emission intensity.

FIG. 19c shows an example of how the temperature gradient of the temperature may vary across a radiator device during operation, such as the one used in FIGS. 19a and 19b. In this example, the temperature gradient has a maximum at a point in the outer regions of the arms 4, adjacent to the pads 3. This is partly because the pads 3 are at a much lower temperature than the arms 4, and partly because of the small cross-sectional area (and therefore high resistance) of the arms at that point. These two factors combined mean that there is a maximum temperature gradient but a minimum thermal energy flow at this point. At the other ends of the arms 4, towards the plate 2, the temperature gradient is a minimum, because the plate 2 is at or near the desired emission temperature. In this state, the temperature gradient is a minimum, the thermal energy flow rate out of the arms and into the plate is a maximum, and the thermal power radiated from the plate 2 is replenished by the thermal inflow from the heated arms 4. As mentioned elsewhere in this description, most or substantially all of the heat for raising the temperature of the plate is generated by resistive heating in the arms 4, and little or no heat is generated by the much lower (in comparison to the arms) resistance of the plate 2.

FIG. 20 shows how spectral radiance (y-axis, in arbitrary units) varies with the wavelength (x-axis) at different plate temperatures.

FIG. 21 shows an example of how the temperature (left-hand vertical axis) and thermomechanical displacement (right-hand vertical axis) vary with time during a heating cycle of the plate 2 of a radiator 1, as would be for the case if a voltage bias is applied as a step function starting at time t=0. As can be seen from the curves, the thermal cycle can reach stability within around 0.3 ms in this example. A similar rate can be seen in the cooling phase (not shown).

Figure 22:
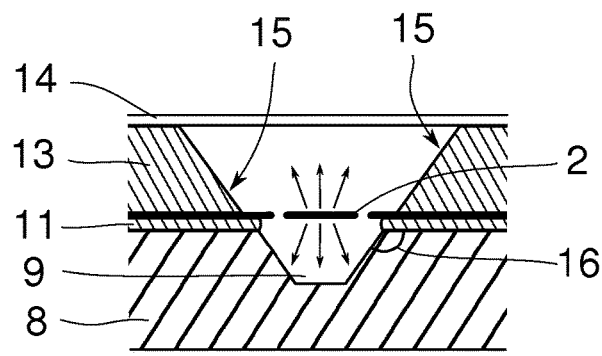

FIG. 22 shows an example of an IR emitter comprising a radiator element fabricated with its radiator plate 2 in an evacuated package, and with an IR-transparent window 14 which also serves as a closure for the vacuum chamber. Directional reflector surfaces 15 are arranged for reflecting the IR generated by the plate 2 towards the window 14. In all variants of the invention, the reflector surface or layer 15, if present, may be formed in the recess 9 below the radiator plate 2 and/or on the side walls of the structure above the radiator plate. The window 14 may be made of sapphire, germanium, silicon or diamond, for example. The material of the window 14 may be selected for its particular IR filtering characteristics, as required. Substrate 8 may be made from silicon, for example, preferably by a material with high thermal conductivity. The spacing layers 11 and 13 are typically electrically-insulating and may be made, for example of silicon oxide, silicon nitride and/or other dielectrics or insulators, preferably with high thermal conductivity. Appropriate electrically insulating barriers added to the interfaces of 11 and 13 allow the materials of 11 and 13 to be made of materials such as semiconductors and conductors, such as for example silicon. The reflective walls may be formed by anisotropic etching, grayscale lithography or otherwise removing the silicon between the 111 and 100 planes to leave a surface at 125.26° to the plane of the substrate 8. The interior of the IR emitter is preferably evacuated to $10^{-3}$ Torr, or preferably $10^{-6}$ or better.

Figure 23:
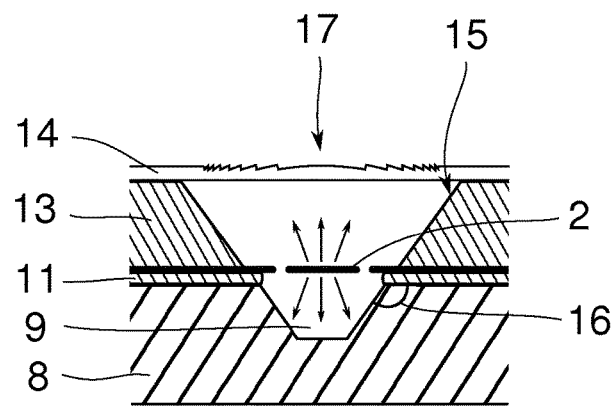

The window 14 may optionally fulfill other functions, in addition to sealing the vacuum chamber, such as optical filtering or lensing. The window material may in part define the IR spectrum emitted from the device, and additional coatings may be added to the surfaces to alter the reflectance and transmittance properties. FIG. 23 shows an example in which the window 14 has been patterned, molded or otherwise treated to provide a Fresnel lens in its outer surface, for varying the focal characteristics of the emitter IR. The window 14 may alternatively, or in addition, be configured to act as a pass or block filter for particular spectral components of the IR. The window may be patterned, or doped, or have material deposited on to it to form metamaterial surfaces for wavelength selection and/or optical path steering.

Figure 24:
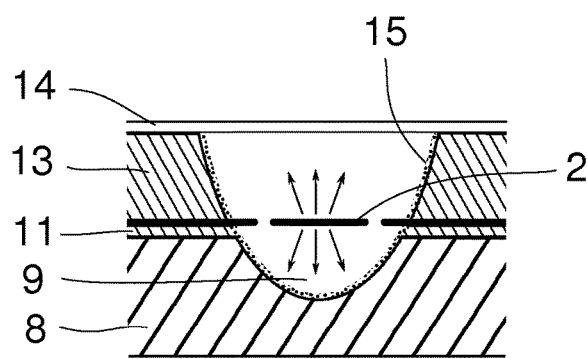
Figure 25:
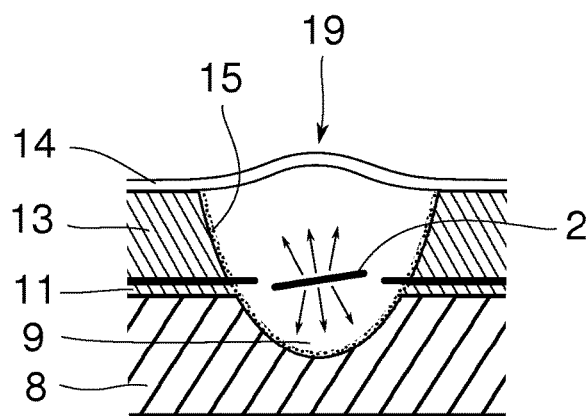

FIG. 24 shows an arrangement in which the chamber walls have a parabolic or elliptical profile, and in which the walls are coated with an IR-reflective coating 18, such as a metallic layer, for improving the proportion of the IR which exits the vacuum chamber through the window 14. The IR-reflective coating 18 may be included in any of the variants described. In a further variant, FIG. 25 shows how the radiator plate 2 may be made steerable or oscillatable, for example by means of capacitive or thermomechanical actuators (not shown). The window may optionally be shaped and/or coated to provide desired optical effects of the emission of the IR.

The steering arrangement illustrated in FIG. 25 can be achieved by segmenting the reflective surface 15. Adding additional electrical leads to access the segmented metallic reflector layer 15 allows a potential to be applied between reflector 15 and the plate 2. As the plate is suspended by springs (arms 4) the plate 2 is free to tip, tilt or piston motion. The force needed to alter the plate orientation is applied by the capacitive force (given approximately as $F \sim \varepsilon_0 A/d * V^2$, where F is the force, $\varepsilon_0$ is the permittivity of free space, A and d is the area of the segment and the separation between the segmented electrode and the plate 2 respectively. V is the voltage between the segmented reflector and the plate). Increasing the number of segments will affect the ability to tip/til/piston the plate, typically 4 segments will suffice. Typically mechanical angles of 10 degrees can be reached, this can be used for steering the emitted light and/or fine-tuning the alignment of the device with other optical components.

FIGS. 26a to 26g show a simplified example of how the radiator may be manufactured at wafer-scale, together with other components of an IR emitter, on a wafer substrate 8. In FIG. 26b, the cavities 9 are etched and the reflective (e.g. metal) coating 15 is deposited. A sacrificial material 20 is then added, planarized and patterned, upon which the device layer 21 (high-temperature ceramic) is formed and patterned into the pads 3, arms 4 and plates 2 that make up the device. In FIG. 26e, the sacrificial material is removed, leaving each of the radiator plates of the device layer 21 suspended over their respective reflective cavities 9. Window 14 may then be added, using handle 24, supported by spacers 23 and bonded by bonding 22, in a high vacuum, to form sealed IR emitters each comprising a vacuum chamber 27 enclosing a high-temperature radiator element as shown in FIG. 26g. The top layer (window 14 in this example) may then serve as the basis for further wafer-scale fabrication processes. Application devices 25 may be fabricated directly on to the IR-emitter wafer, or they may be fabricated separately and then aligned and bonded to the IR-emitter wafer to form application devices with integrated IR-emitters, as indicated in FIG. 26h. This is useful, for example, in miniaturizing IR interferometers or similar application device. The individual stacked assemblies (e.g. gas sensors, chemical sensors, IR interferometers etc) may then be diced and packaged in individual surface mounted technology packages or other discrete devices. At this level of miniaturization, it is possible to produce application devices, complete with IR emitters, with a footprint as small as 300×300 µm, or even smaller.

FIGS. 26a-26g describe an example method, using a two-wafer approach in which one wafer holds the radiator element and associated electronic leads, and the second wafer holds the spacers 23, the IR window, and additional functional surfaces (bonding layer 22 and getter layer for absorbing gases). The two wafers are bonded and sealed in vacuum to generate individual stand-alone vacuum chambers. In an alternative realization the entire stack can be fabricated in a stacked approach. Continuing from FIG. 26e, additional spacer material can be added and patterned, followed by the deposition of the patterned getter material, and finally the IR window 14, which can be made of germanium, for example.

FIGS. 27 and 28 show cross-sectional views of two variants of an application device with integrated high-temperature ceramic radiator plate. In the illustrated example, the application device is a gas sensor comprising a Fabry-Perot Interferometer (FPI) 25 and an IR emitter 1 comprising a refractory ceramic radiator plate 2 suspended over a concave recess 9 in a vacuum chamber 27 hermetically sealed by IR transparent window 14 which is supported on spacers 23. The cavity 9, also under vacuum, has a reflective coating or surface 15 for directing the IR generated by the radiator plate 2 towards the window 14. Contacts 30 permit electrical connection to the pads 3 of the radiator, so that a voltage or current can be applied across the heater/support springs 4, thereby heating the plate 2 to temperatures in excess of 1,600 K, or 2,000 K, or 2,500 K, or even up to 4,000 K or higher. The radiator plate 2, the springs 4 and the pads 3 may be made of HfC or TaC or TaHfC, for example, or some other suitable refractory ceramic material. FPI device 25 comprises upper and lower partial reflectors 31 and 32, which together form a Fabry-Perot resonant chamber and act as an optical band-pass filter. The FPI can be tuned by means of actuators 29 in known fashion, by moving the upper reflector 32 nearer or further from the lower reflector. In the variant shown in FIG. 27, the IR detector of the FPI is located in a stationary position on the inner surface of an upper closure member of the FPI device. In the variant of FIG. 28, by contrast, the FPI IR detector is mounted so as to move with the upper reflective element 32 of the FPI filter 25. This arrangement, in which the FPI IR mirror is mounted on the moving reflector, or is mounted to move with the moving reflector, is not limited to use with the reflector device of the invention, and may be used with other types of IR emitter.

In both variants of the FPI, when they are implemented as a gas/chemical sensor, the gas to be detected/analyzed is in the cavity area 33 which comprises the space between the two partially reflective mirrors 31 and 32.

The FPI 25 may be fabricated directly on to the window 14 of the IR emitter 1, or it may be fabricated separately and then aligned and bonded to the window 14 of the IR emitter 1.

Other possible applications of an IR emitter comprising a radiator device according to the invention include a Michelson Morley Interferometer (MMI). In an MMI, the optical path is in plane with the wafer, which allows for much longer optical paths, which is advantageous for gas sensing.

The invention claimed is:

1. A radiator device for an IR emitter micro-hotplate, the radiator device comprising:
an IR emitter element, and a plurality of support arms, connected to the emitter element, wherein:
the emitter element is suspended by the arms, and
the emitter element is heatable to a predetermined IR emission temperature by resistive heating in the arms, wherein the emitter element is configured to be heatable to the predetermined IR emission temperature entirely or in a great majority by the said resistive heating in the arms, by thermal conduction from the arms into the emitter element, wherein the emitter element has a lower electrical resistance in comparison to the arms, so that little or no heat is generated by emitter element.

2. The radiator device according to claim 1, wherein the said IR emission temperature is greater than 1,600 K.

3. The radiator device according to claim 1, wherein the emitter element and the arms are formed as a single contiguous piece of material.

4. The radiator device according to claim 3, wherein the material is an electrically-conducting refractory ceramic.

5. The radiator device according to claim 4, wherein the ceramic comprises carbon, HfC, TaHfC or tungsten carbide.

6. The radiator device according to claim 1, wherein the number of arms is even, and where the even number is at least 4.

7. The radiator device according to claim 1, wherein the arms are elastically deformable so as to absorb thermomechanical changes in shape and/or size of the emitter element and/or of the arms during heating and cooling or the emitter element.

8. The radiator device according to claim 1, wherein each of the arms has a cross-section which varies along its length such that its cross-sectional area is a minimum at a region of the arm adjacent to the emitter element.

9. An IR emitter device comprising a radiator device according to claim 1, wherein the emitter element and the arms are encapsulated in a housing comprising an TR-transparent window.

10. The IR emitter device according to claim 9, wherein the housing is evacuated to $10^{-3}$ Torr.

11. A gas-sensing, pressure sensing, gas analyzing, IR spectrometer, SEM or TEM device comprising an IR emitter device according to claim 9.

12. A portable-communications device comprising a gas sensing, pressure sensing, gas analyzing, IR spectrometer, SEM or TEM device according to claim 11.

13. A method of generating broadband infrared radiation, comprising:
using an IR emitter device according to claim 9, and
applying a voltage across the arms so as to heat the emitter element to a temperature greater than 1,600 K.

14. The method according to claim 13, comprising pulsing the voltage at a frequency greater than 200 Hz.

15. A method of manufacturing an IR emitter device, comprising a first fabrication process of fabricating multiple radiator devices according to claim 1 on a single wafer.

16. The method according to claim 15, further comprising a second fabrication process of fabricating, aligned with each of the radiator devices, one or more components of an application device, in particular a gas sensing, pressure sensing, gas analyzing, IR spectrometer, SEM or TEM device, so as to produce the said application device, including the said each radiator device.

17. A gas sensing, pressure sensing, gas analyzing, IR spectrometer, SEM or TEM device comprising an IR emitter device that includes a radiator device according to claim 1.

18. The radiator device according to claim 1, wherein the arms are elastically deformable so as to absorb thermomechanical changes in shape and/or size of the emitter element and/or of the arms during heating and cooling or the emitter element.

19. A method of generating broadband infrared radiation, comprising:
  using an IR emitter device that includes a radiator device according to claim 1, and
  applying a voltage across the arms so as to heat the emitter element to a temperature greater than 1,600 K.

* * * * *